US007050861B1

(12) United States Patent
Lauzon et al.

(10) Patent No.: US 7,050,861 B1
(45) Date of Patent: May 23, 2006

(54) CONTROLLING A DESTINATION TERMINAL FROM AN ORIGINATING TERMINAL

(75) Inventors: Eric Lauzon, Crowthorne (GB); Bryan J Miller, Cookham (GB); Michael O'Doherty, London (GB)

(73) Assignee: Nortel Networks Limited, St. Laurent (CA)

( * ) Notice: Subject to any disclaimer, the term of this patent is extended or adjusted under 35 U.S.C. 154(b) by 1052 days.

(21) Appl. No.: 09/606,053

(22) Filed: Jun. 28, 2000

Related U.S. Application Data

(60) Provisional application No. 60/171,777, filed on Dec. 22, 1999, provisional application No. 60/171,801, filed on Dec. 22, 1999.

(51) Int. Cl.
*G05G 11/00* (2006.01)
(52) U.S. Cl. .............................. 700/17; 700/19; 700/65; 700/83; 709/200; 709/208; 709/220; 709/227; 709/228; 379/188; 379/201.01; 379/201.03; 379/201.05; 379/203.01; 379/204.01
(58) Field of Classification Search ................. 700/17, 700/65, 83, 19; 345/804; 709/200, 208, 709/220, 227–228; 379/188, 201.01, 201.03, 379/201.05, 203.01, 204.01
See application file for complete search history.

(56) References Cited

U.S. PATENT DOCUMENTS

| | | | | |
|---|---|---|---|---|
| 5,867,494 A * | 2/1999 | Krishnaswamy et al. | ... | 370/352 |
| 6,161,134 A * | 12/2000 | Wang et al. | ................ | 709/220 |
| 6,285,364 B1 * | 9/2001 | Giordano et al. | ........... | 345/804 |
| 6,359,892 B1 * | 3/2002 | Szlam | ........................ | 370/401 |
| 6,446,070 B1 * | 9/2002 | Arnold et al. | ................ | 707/10 |
| 6,446,127 B1 * | 9/2002 | Schuster et al. | ............ | 709/227 |
| 6,502,127 B1 * | 12/2002 | Edwards et al. | ............ | 709/206 |
| 6,564,261 B1 * | 5/2003 | Gudjonsson et al. | ........ | 709/227 |
| 6,584,490 B1 * | 6/2003 | Schuster et al. | ............ | 709/200 |
| 6,615,236 B1 * | 9/2003 | Donovan et al. | ........... | 709/203 |
| 6,714,536 B1 * | 3/2004 | Dowling | ..................... | 370/356 |

OTHER PUBLICATIONS

SIP : Session Initiation Protocol; RFC 2543; by Handley et al; published Mar. 1999; entire document.*
ChaiTime: A System for Rapid Creation of Portable Next-Generation Telephony Services Using Third-Party Software Components, Farooq Anjum et al., IEEE Mar. 26-27, 1999; pp. 22-31.*
"Under the Hood: The architecture of aglets", by Bill Venners, JavaWorld Apr. 1997.

(Continued)

*Primary Examiner*—Anthony Knight
*Assistant Examiner*—Ronald D Hartman, Jr.
(74) *Attorney, Agent, or Firm*—Barnes & ThornburgLLP

(57) ABSTRACT

A caller associates computer software code with a signalling protocol messages such that when the messages are received at a destination processor the computer software code is executed. For example, the messages may be improved SIP protocol messages with incorporated Java code. By selecting different computer software code for association with the messages, the caller is able to control the destination terminal. For example, to display information about the identity of the caller at the destination terminal; to modify the behaviour of the destination terminal according to the priority of the call; to take into account the configuration of the destination terminal, and to allow users to adjust this configuration from a remote location.

13 Claims, 11 Drawing Sheets

OTHER PUBLICATIONS

Krause, "Mobile Service Agents Enabling "Intelligence on demand" in Telecommunications", Global Telecommunications Conference 1996, pp 78-84.

Kristensen, "The SIP Servlet API", Internet Draft, 1999, pp 1-26.

Kaukonen, "Agent-Based Conferencing Using Mobile IP-Telephony", 3rd Workshop on Multimedia Signal Processing, Sep. 1999, pp 593-598.

Guedes, "An Agent-Based Approach for Supporting Quality of Service In Distributed Multimedia Systems", Computer Communicaiton, Sep. 15, 1998, pp. 1269-1278.

Breugst, "Mobile agents—enabling technology for active intelligent network implementation," May-Jun., 1998, 8 pages.

"A Beginner's Guide to URL's", National Center for Supercomputing Applications, Dec. 16, 2003.

* cited by examiner

PRIOR ART

C ->S: INVITE sip:watson@boston.bell-tel.com SIP/2.0
Via: SIP/2.0/UDP kton.bell-tel.com>
From: A. Bell ,sip:a.g.bell@bell-tel.com>
To: T. Watson ,sip:watson@bell-tel.com.
Call-ID: 3298420296@kton.bell.tel.com
Cseq: 1 INVITE
Subject: Mr. Watson, come here.
Content-Type: multipart/mixed; boundary=3E4A567F4C8A
(or URL for java applet)
Content-Length: ...
Require: org.ietf.sip.java-enhanced-sip (Within the message body)

--3E4A567F4C8A
    Content-Type: application/x-sipjava
    Content-Encoding: binary
    Content-length: xxx
    ...Java applet or Java mobile agent for SIP message processing...
--3E4A567F4C8A--

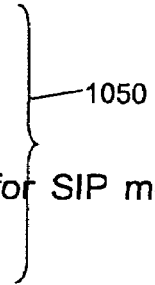

Figure 15

```
Request    =  Request-Line
              *( general-header  ;
               | request-header
               | entity-header          } 1040
              CRLF
              [ message-body ]  ;
```

```
general-header  =  Accept              ;
                 | Accept-Encoding     ;
                 | Accept-Language     ;
                 | Call-ID             ;
                 | Contact             ;
                 | CSeq                ;
                 | Date                ;
                 | Encryption          ;   } 1041
                 | Expires             ;
                 | From                ;
                 | Record-Route        ;
                 | Timestamp           ;
                 | To                  ;
                 | Via                 ;

entity-header   =  Content-Encoding    ;
                 | Content-Length      ;
                 | Content-Type        ;  ← This will indicate that
request-header  =  Authorization       ;    the content type is a
                 | Contact             ;    java applet or a Java
                 | Hide                ;    Mobile Agent (or the URL
                 | Max-Forwards        ;    of a location of either
                 | Organization        ;    from where they must be
                 | Priority            ;    retrieved).
                 | Proxy-Authorization ;
                 | Proxy-Require       ;
                 | Route               ;  ← This will be used to
                 | Require             ;    indicate that Java-
                 | Response-Key        ;    enhanced-SIP must be
                 | Subject             ;    supported to process
                 | User-Agent          ;    this message
response-header =  Allow               ;
                 | Proxy-Authenticate  ;
                 | Retry-After         ;
                 | Server              ;   } 1044
                 | Unsupported         ;
                 | Warning             ;
                 | WWW-Authenticate    ;
```

Figure 16

CONTROLLING A DESTINATION TERMINAL FROM AN ORIGINATING TERMINAL

RELATED APPLICATIONS

This application is the non-provisional filing of provisional U.S. Patent Applications 60/171,777 and 60/171,801, both filed on Dec. 22, 1999.

BACKGROUND OF THE INVENTION

1. Field of the Invention

This invention relates to a method of remotely controlling a destination terminal from an originating terminal. The invention is particularly related, but in no way limited to, using improved session initiation protocol (SIP) to enable a caller to control an originating terminal.

2. Description of the Prior Art

The amount of control that an originating terminal has over a destination terminal has been very restricted. For example, when making an extremely urgent call to a busy destination terminal, the caller is unable to free up the busy destination terminal by causing the call that is currently in progress to be dropped. Also, the called party may have particular services set-up on his or her terminal and the calling party is unable to take these into account easily or to modify the set-up services. This is particularly problematic when a caller wishes to adapt his or her call as a result of taking the called party's terminal configuration into account. For example, a user may be accustomed to setting his or her terminal to ring three times before going to voice mail, during times when that user is resting. At other times, suppose that the user sets his or her terminal to ring five times before going to voice mail. The user's family members may wish only to make a call to the user when the user is not resting. However, this is not possible because callers are unable to take into account set-up configurations on the user's terminal.

Similarly, calling parties are unable to easily provide information to the called party and to cause the destination terminal to display or act upon this information. For example, a calling party may wish to provide information about his or her identity to the called party. In the past this has been done by associating each terminal with a particular user. However, this is problematic when users move about and use different terminals. Also, prior art systems which display the caller identity at the destination terminal are fixed systems. That is, the caller is unable to easily change or modify the manner in which the destination terminal displays or acts upon the identity information.

It is accordingly an object of the present invention to provide a method of remotely controlling a destination terminal from an originating terminal, which overcomes or at least mitigates one or more of the problems noted above.

SUMMARY OF THE INVENTION

According to an aspect of the present invention there is provided a method of remotely controlling a destination terminal from an originating terminal said destination terminal having an associated signalling protocol client and an associated processor comprising the steps of:

associating computer software code with at least one signalling protocol message;

sending the signalling protocol message to the destination terminal from the originating terminal;

executing the computer software code using the processor associated with the destination terminal in order that the originating terminal controls the destination terminal.

This provides the advantage that an originating terminal is able to control a destination terminal. For example, to display information about the identity of the caller on the destination terminal or to modify the behaviour of the destination terminal on the basis of priority information provided by the calling party.

According to another aspect of the present invention there is provided an originating terminal arranged to control a destination terminal said originating terminal comprising:— an input arranged to access computer software code suitable for controlling said originating terminal;

a processor arranged to associate said computer software code in use with one or more signalling protocol messages; and an output arranged to route said signalling protocol messages to the destination terminal in use.

This provides the advantage that by using such an originating terminal a user is able to control a destination terminal.

According to another aspect of the present invention there is provided a destination terminal comprising:— a signalling protocol client arranged to receive one or more signalling protocol messages sent from an originating terminal;

a processor arranged to access any computer software code associated with received signalling protocol messages in use; and wherein said processor is arranged to execute such accessed computer software code such that the destination terminal is controlled.

This provides the advantage that a destination terminal which can be controlled from a remote location by an originating terminal is provided.

According to another aspect of the present invention there is provided a signal comprising one or more signalling protocol messages which are associated with computer software code. This provides the advantage that the functions of the signalling protocol messages are greatly extended. For example, the signalling protocol messages can be sent from an originating terminal to a destination terminal to control that destination terminal.

According to another aspect of the present invention there is provided a method of displaying information about the identity of a caller at a destination terminal comprising the steps of:

providing a database comprising information about the identity of a plurality of originating terminals and a caller associated with each originating terminal;

initiating a call from an originating terminal to a destination terminal;

receiving information at the originating terminal about the identity of a caller and forwarding this information from the originating terminal to the database and updating the database with this information; and accessing the identity of the caller associated with the originating terminal from the database and displaying that identity at the destination terminal.

This provides the advantage that the database of caller identity information is updated prior to use so that the identity information displayed is correct, even if the caller uses different terminals or several users use the same terminal.

Further benefits and advantages of the invention will become apparent from a consideration of the following detailed description given with reference to the accompanying drawings, which specify and show preferred embodiments of the invention.

BRIEF DESCRIPTION OF THE DRAWINGS

FIG. 15 shows the format of an improved SIP protocol message.

FIG. 16 is an example of an improved SIP protocol INVITE message.

DETAILED DESCRIPTION OF THE INVENTION

Embodiments of the present invention are described below by way of example only. These examples represent the best ways of putting the invention into practice that are currently known to the Applicant although they are not the only ways in which this could be achieved.

The term "originating terminal" is used to refer to an apparatus via which a user is able to send communications into a communications network in order to call another party; for example, a telephone handset, a computer terminal or a mobile telephone handset.

The term "destination terminal" is used to refer to an apparatus via which a user is able to receive communications from the communications network in order to be called by another party; for example, a telephone handset, a computer terminal or a mobile telephone handset.

The term "calling party" is used to refer to an entity which sends a communication into a communications network in order to communicate with a called party.

The term "called party" is used to refer to an entity which receives communications from a calling party via a communications network.

The present application is at least in part an extension of Nortel Networks's earlier work described in co-assigned, earlier U.S. patent application Ser. No. 09/520,853, filed on 7 Mar. 2000 (Nortel reference 11790 ID). That patent document describes an improved Session Initiation Protocol (SIP). Using this improved SIP protocol computer software code is associated with SIP messages. These SIP messages are sent to a SIP client which is arranged to execute the software code associated with the SIP messages. The specific description from U.S. patent application Ser. No. 09/520,853 is repeated in Appendix A.

Figure 1:
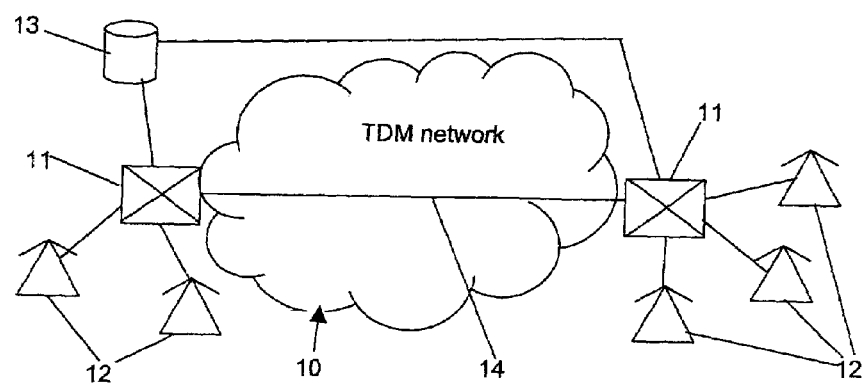
FIG. 1 is a schematic diagram of a time division multiplex (TDM) communications network arrangement according to the prior art.

FIG. 1 shows a prior art arrangement in which a plurality of terminals 12 (such as telephone handsets) are connected to a time division multiplex (TDM) communications network (such as a public switched telephone network) via access nodes 11. A database 13 is also provided which is accessible by each of the access nodes 12. The database contains pre-specified information about the identity of each terminal 12 (for example, the calling line identifier (CLID)) and the name of a user associated with each terminal. When a caller initiates a call, the name associated with the terminal from which the call is being made is accessed from the database 13 and displayed at the called terminal. In some circumstances this lets the called party know who is calling before the call is answered. However, often one particular terminal is associated with more than one person and in addition, callers are mobile and often use different terminals to make calls. Arrangements like that illustrated in FIG. 1 are not able to deal with these situations and simply display the name of the one user associated with the particular terminal being used, even if a different person is actually using that terminal.

Another prior art arrangement involves storing pre-specified information about the identity of terminals at their associated access nodes 11. For example, this information comprises the CLID of each terminal 12 which is connected to the access node 11 and the name of a user associated with each of those terminals 12. When a caller initiates a call, the name associated with the terminal from which the call is being made is sent with the call to the destination terminal. The name information is static and because of this the system is not flexible and cannot take account of the fact that different users use the same originating terminal or that individual users move about and use different terminals.

Figure 2:
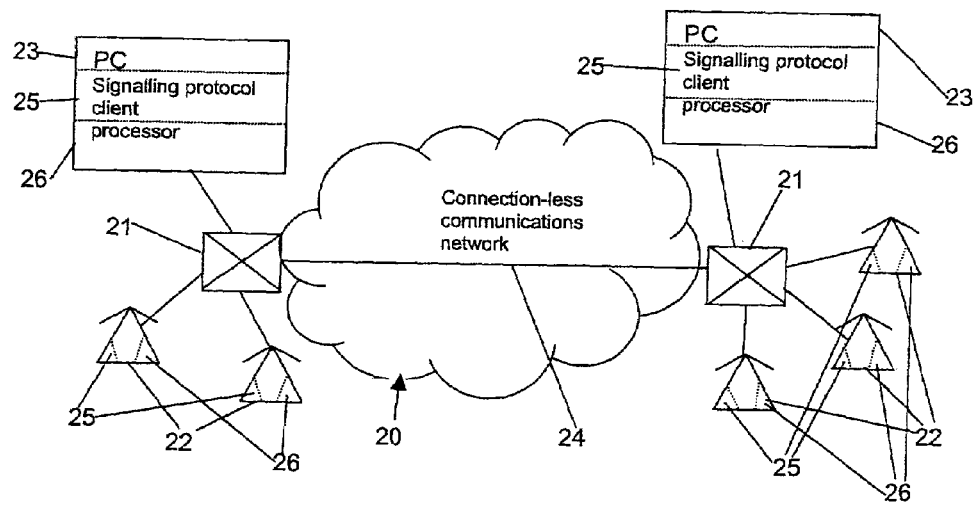
FIG. 2 is a schematic diagram of a connectionless communications network suitable for use with the present invention.

FIG. 2 illustrates an embodiment of the present invention in which information about the identity of a caller is made available to the called party independently of the particular terminal being used by the caller. A plurality of terminals 22, 23 are connected to a connectionless communications network 20 such as an internet protocol (IP) communications network via access nodes 21 such as voice over internet protocol (VoIP) gateways. Calls are set-up between two terminals using any suitable signalling protocol such as session initiation protocol (SIP). The terminals may be for example, personal computer based telephones 23 or conventional telephone handsets 22. Associated with each terminal is a signalling protocol client 25 which is a computer program that is arranged to control the terminal such that it is able to send and/or receive messages according to the particular signalling protocol being used. This signalling protocol client program 25 may be provided on any suitable computing platform integral with the terminal or accessible by the terminal. As well as the signalling protocol client 25, a processor 26 is associated with each terminal and the processor 26 is arranged to execute any computer software code that is associated with signalling protocol messages received from callers.

Figure 4:
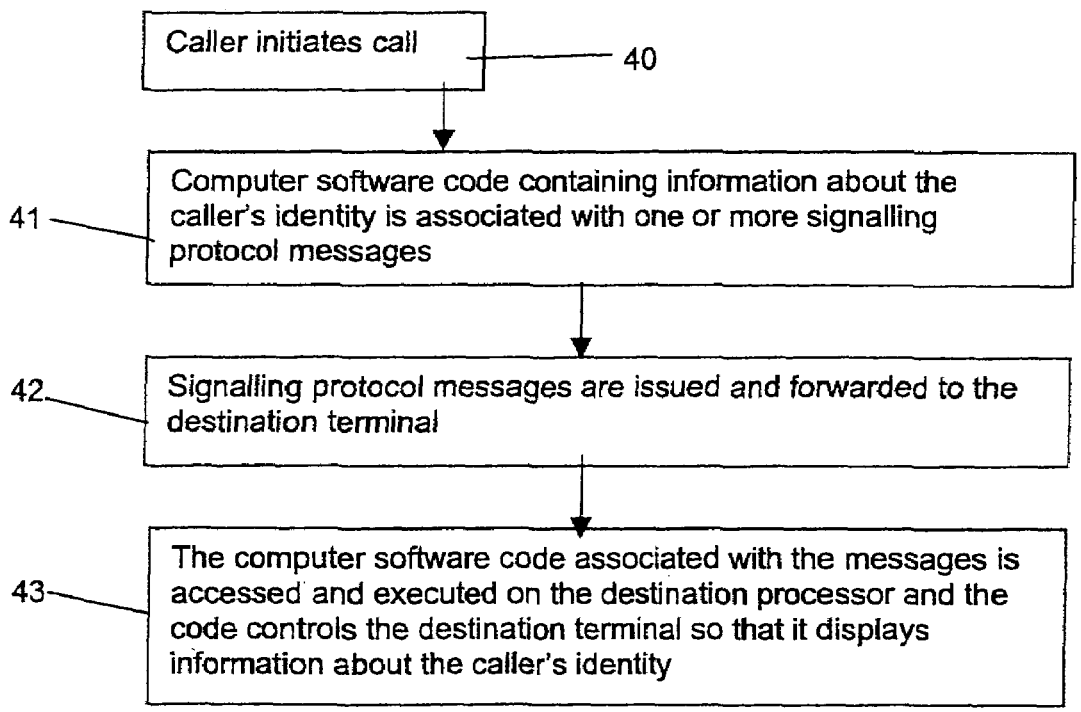
FIG. 4 is a flow diagram of a method of controlling a destination terminal such that information about the identity of the calling party is displayed at the destination terminal.

With reference to FIG. 4, when a caller initiates a call (box 40 of FIG. 4), computer software code is associated with one or more signalling protocol messages issued by the caller's terminal in order to set-up the call (box 41 of FIG. 4). This computer software code contains information about the caller's identity or a reference to this information. The signalling protocol message issued by the caller's terminal is forwarded (box 42 of FIG. 4) to the called party's terminal and the associated computer software code is accessed. This code is then executed on the processor 26 associated with the called party's terminal, provided that security provisions on the destination terminal allow this (box 43 of FIG. 4). The executed code controls the destination terminal such that it displays the identity of the caller. For example, by playing a sample of the caller's voice or by displaying the caller's name on a visual display.

By using this method, the caller's identity is correct no matter which terminal the caller uses and it is not necessary to make use of CLID information.

The example described above of allowing a caller to control a destination terminal in order to display information about the caller's identity is only one embodiment of the present invention. More generally, the invention provides a way for callers to control a destination terminal by selecting computer software code for association with SIP messages, or any other suitable signalling protocol messages. This control of the destination terminal is of course subject to any security and access restriction arrangements that are set-up on the destination terminal. The default situation is that the destination terminal is controlled by its associated signalling protocol client and associated processor. Thus the caller does not have absolute control over the destination terminal except in cases where the security and access restrictions allow this.

A calling party (or other user) is able to select or create the computer software that is to be associated with the signalling protocol messages using a user interface such as a graphical user interface (GUI). Once this code is selected or created it is stored in a location that is accessible by the calling party's signalling protocol client. This location could be at the terminal itself, at a gateway from which the terminal subtends or at any other suitable location. In addition, rules or other criteria are stored which specify when particular pieces of the stored computer software are to be associated with SIP or other signalling protocol messages.

Figure 3:
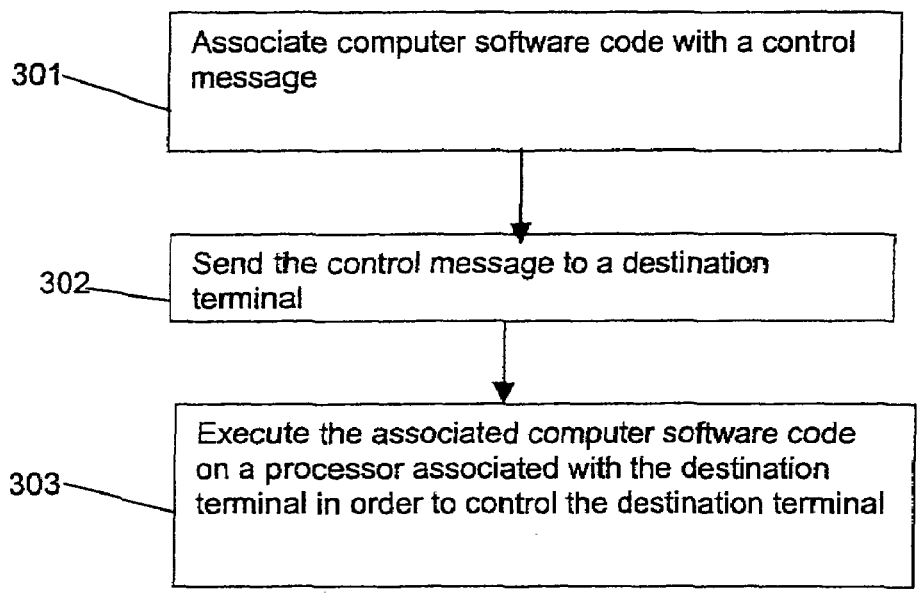
FIG. 3 is a flow diagram of a method of controlling a destination terminal from an originating terminal.

FIG. 3 is a flow diagram for a method of controlling a destination terminal from an originating terminal. Computer software code is first associated with a signalling protocol message (box 301) and then that signalling protocol message is forwarded to a destination terminal (see box 302 of FIG. 3). The computer software code is then executed on a processor associated with the destination terminal in order to control the destination terminal (box 303 of FIG. 3).

The computer software code may be associated with the signalling protocol message in any suitable manner, for example, by adding the code to the message or adding a reference to the location of the code to the message. Any suitable signalling protocol messages may be used, such as session initiation protocol (SIP) messages. Appendix A gives more details about this.

Several different examples of ways in which the destination terminal is controlled are now described.

In one example, the caller is able to provide information about the priority of the call. In the past this has not been possible for conventional public switched telephone network systems where the CLID and ringing tone are all that is available to alert the called party to the call request. Answering machines can be used but in that case the called party must be available to listen to incoming calls and answer these if they are urgent.

Figure 5:
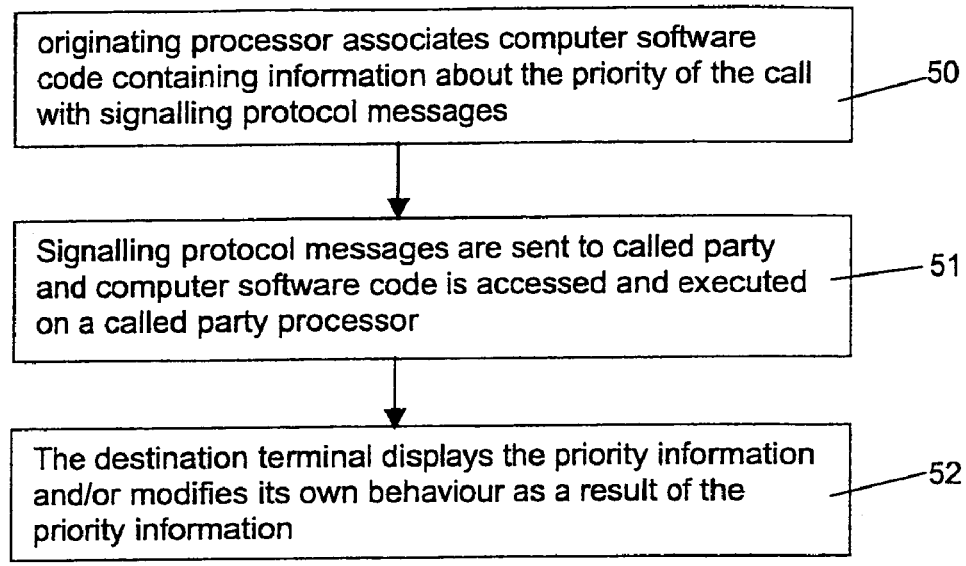
FIG. 5 is a flow diagram of a method of controlling a destination terminal using information about the priority of the call.

FIG. 5 is a flow diagram of a method of controlling a destination terminal using information about the priority of the call. The calling party processor associates computer software code which contains information about the priority of the call (or a reference to the location of this information) with one or more signalling protocol messages (box 50 of FIG. 5). When the signalling protocol message is received by the destination terminal, the code is executed as described above (box 51 of FIG. 5) and this causes the priority information to be displayed and/or to affect the behaviour of the destination terminal (box 52 of FIG. 5). For example, if the priority of the call is very urgent, then the code may cause the destination terminal to re-direct the call to an associated mobile telephone. As mentioned above this is subject to access and security restrictions. For example, the called party may have set up a database containing the identities of callers who should be given access at all times, those to whom access is to be denied and those to whom access should be given only during certain time periods. In this case, information about the caller's identity is obtained and used to determine which access levels are to be given.

In some situations, the destination terminal is engaged. In this case the computer software code associated with the signalling protocol message may be arranged to cause the destination terminal to be cleared (subject to security and access restrictions). For example, the caller may be trying to reach a family member urgently. The called party has previously stored the names of people who are allowed to cause the called party's terminal to be cleared of an "in progress" call. The called party may also have set up a password system whereby the caller must provide the password before being able to clear "in progress" calls. In this case, the computer software code sent by the caller with the signalling protocol message contains the password and/or name of the caller.

Figure 6:
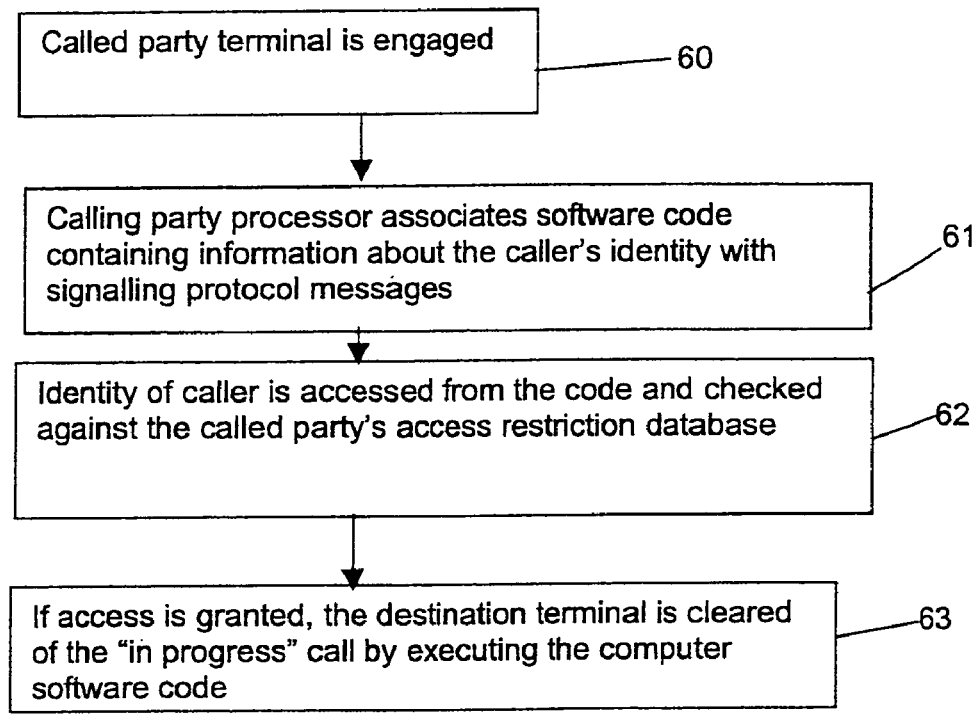
FIG. 6 is a flow diagram of a method of controlling a destination terminal in order to clear an "in progress" call from the destination terminal.

This process is illustrated in more detail in FIG. 6. In the situation when the destination terminal is engaged (box 60 of FIG. 6) the calling party processor associates computer software code, containing information about the caller's identity and code for clearing the "in progress" call from the destination terminal, with signalling protocol messages (box 61 of FIG. 6). These messages are forwarded to the called party and the called party processor accesses the information about the identity of the caller (box 62 of FIG. 6). The called party processor checks the identity of the caller against an access restriction database (previously set up by the called party). If access is granted to the particular caller, then the software code is executed in order to clear the "in progress" call from the destination terminal (box 63 of FIG. 6).

The called party may also configure the signal processing client associated with its terminal such that "in progress" calls can only be cleared under certain circumstances. For example, when the "in progress" call is to an internet service provider or to one of a list of pre-specified destinations. In this way the called party is able to specify things like "If I am using the internet I am happy to allow family members to shut down my internet connection in order that they can telephone me." The called party is able to set up the security and access restrictions by using a user interface to modify the signal protocol client and any other software which controls the processor associated with the destination terminal.

The calling party is also able to select or create appropriate computer software code such that the configuration of the destination terminal is checked and taken into account before taking further action. For example, the number of rings at the destination terminal may be set to 3 before the call is diverted to a voice mail system. A caller may know that the called party only sets this number of rings to three when he or she is resting. In that case, the caller may prefer not to disturb the called party at all. The caller is then able to arrange the computer software code associated with the signalling protocol message such that it checks the "number of rings before divert to voice mail" setting at the destination terminal before proceeding with the call.

Known telephone systems, such as those in North America, have a facility whereby the calling party is able to block information about the CLID from the called party. This facility is often used by mobile phone callers who wish to prevent others from obtaining their mobile phone number. This is because they wish to prevent others from making calls to their mobile telephone which incur cost to the mobile phone owner. However, many non-mobile phone users have made use of the blocking facility, for example, sales people who wish to hide their identity in order that people will answer their calls. This has led to the creation of a service by which users are able to "block the blocker"; that is, users are able to block calls from any party who has blocked information about their identity from being made available to the called party. This "block the blocker" facility can be problematic in some circumstances. For example, consider a mobile phone user who has made use of the blocking facility. If that mobile phone user makes a call to a family member that family member is unaware of the identity of the caller. Suppose that the family member has implemented the "block the blocker" function on his or her terminal. In that case the user's call to the family member is blocked, even though that call may be extremely urgent. By making use of the present invention this problem is overcome. The user is able to control the family member's terminal in order to override the "block the blocker" function. For example, the caller sends signalling protocol messages containing a password which the called party receives and checks against pre-specified security criteria. If security clearance is obtained, software code associated with the signalling protocol messages ensures that the "block the blocker" function on the destination terminal is over-ridden.

In another example, the caller is able to control the destination terminal to give preferred handling to the call. For example, the caller is able to control the destination terminal such that the call is directed straight to a voice mail service or straight to the called party's mobile telephone. Prior art systems which allow a user to call a voice mail system directly (rather than being diverted to the voice mail system from the destination terminal) are difficult to use. Typically the caller must dial the number to connect to the voice mail system and then enter details about who is being called. This is time consuming and complex. By using the present invention this problem is avoided because a call with the called party is actually established unlike the prior art situation where a call is established directly with the voice mail system.

Figure 7:
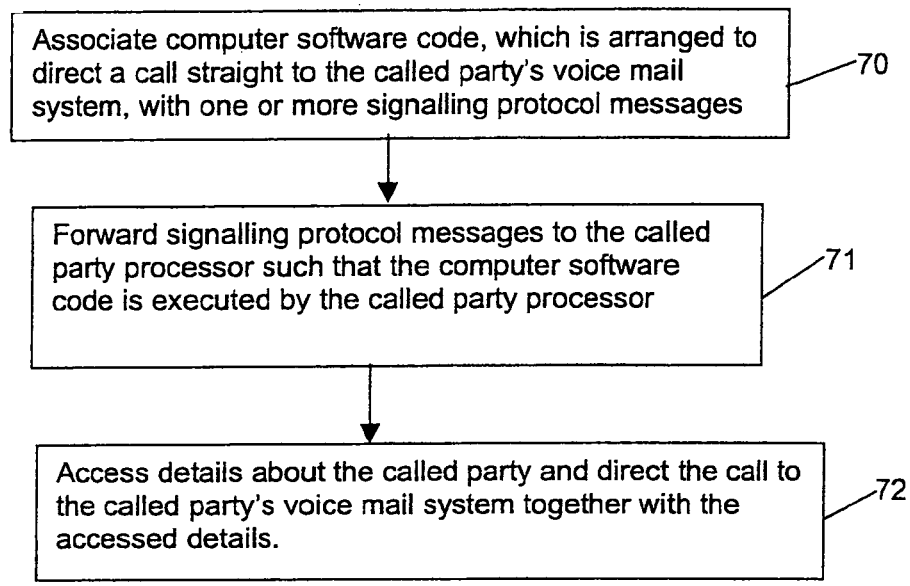
FIG. 7 is a flow diagram of a method for controlling a destination terminal in order that the call is directed straight to a voice mail system.

FIG. 7 is a flow diagram of a method for controlling a destination terminal in order that the call is directed straight to a voice mail system. The calling party processor associates computer software code with one or more signalling protocol messages (box 70, FIG. 7). This computer software code is arranged to control the destination terminal such that the call is directed straight to the voice mail system rather than causing the destination terminal to ring. The signalling protocol messages are forwarded to the called party (box 71 FIG. 7) and the computer software code accessed and executed on the called party processor (subject to any security restrictions). A call is effectively established between the calling and called party at this stage, although the destination terminal does not ring. Because a call is effectively established, details about the called party are available. The computer software code accesses these details and controls the called party processor such that the call is directed to the called party's voice mail system. The information about the called party is also forwarded to that voice mail system so that the called party is not required to re-enter these details (box 72 of FIG. 7).

In another example, a user is able to adjust the configuration of his or her terminal from a remote location. For example, that user acts as a calling party and calls his or her own terminal. Using the method described herein for controlling destination terminals, the user is then able to control his or her own terminal. For example, the user is able to adjust services such as "number of rings before call sent to voice mail" and other such terminating services from a remote location. This is achieved by associating appropriate computer software code with signalling protocol messages and forwarding these to the called party processor for execution.

Figure 8:
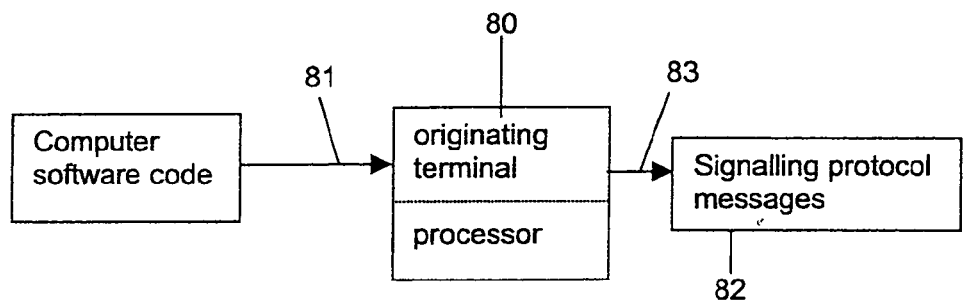
FIG. 8 is a schematic diagram of an originating terminal.

FIG. 8 shows an originating terminal 80 in more detail. The originating terminal has:
- an input 81 arranged to access computer software code suitable for controlling said originating terminal;
- a processor 82 arranged to associate said computer software code in use with one or more signalling protocol messages; and
- an output 83 arranged to route said signalling protocol messages to the destination terminal in use.

It is not essential for the processor 82 to be integral with the originating terminal 80. It is also possible for the processor to be physically separate from the originating terminal as long as communication between the processor and originating terminal is provided.

Figure 9:
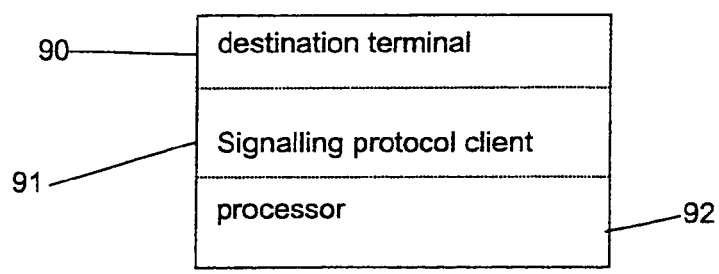
FIG. 9 is a schematic diagram of a destination terminal.

FIG. 9 shows a destination terminal 90 in more detail. The destination terminal 90 comprises:
- a signalling protocol client 91 arranged to receive one or more signalling protocol messages sent from an originating terminal;
- a processor 92 arranged to access any computer software code associated with received signalling protocol messages in use; and wherein said processor is arranged to execute such accessed computer software code such that the destination terminal is controlled.

As for the originating terminal, it is not essential for the processor 92 to be integral with the destination terminal 90. The same applies for the signalling protocol client 91.

However, communication between the processor 92 and the destination terminal 90 and between the signalling protocol client 91 and the destination terminal 90 must be provided.

Figure 10:
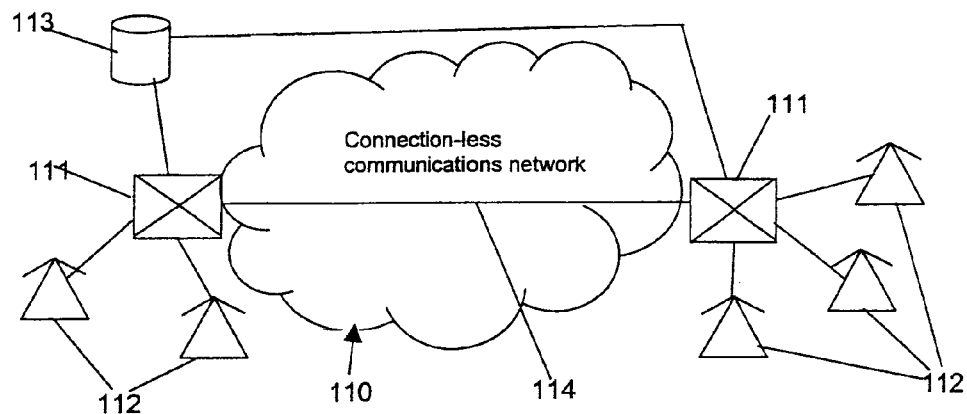
FIG. 10 is a schematic diagram of a connectionless communications network suitable for use with an embodiment of the present invention

FIG. 10 illustrates another embodiment of the present invention. A plurality of terminals 112 (such as telephone handsets) are connected to a connectionless communications network (such as an internet protocol communications network) via access nodes 111. A database 113 is also provided which is accessible by each of the access nodes 112. The database contains pre-specified information about the identity of each terminal 112 (for example, the calling line identifier (CLID)) and the name of a user associated with each terminal. When a caller initiates a call, information about the caller's identity is forwarded to the database 113 and used to update the database 113. For example, the identity information is forwarded to the database 113 by being associated with a signalling protocol message that is forwarded to the database. Also, it is not essential for the database to be located separately from other components of the communications network. For example, the database may be incorporated into the access nodes 111. The caller's identity is then accessed from the database 113 by a destination terminal and displayed at that destination terminal. By dynamically updating the database 113 in this way, the correct identity information is displayed no matter whether the user uses different terminals 112 or several users use the same terminal.

Figure 11:
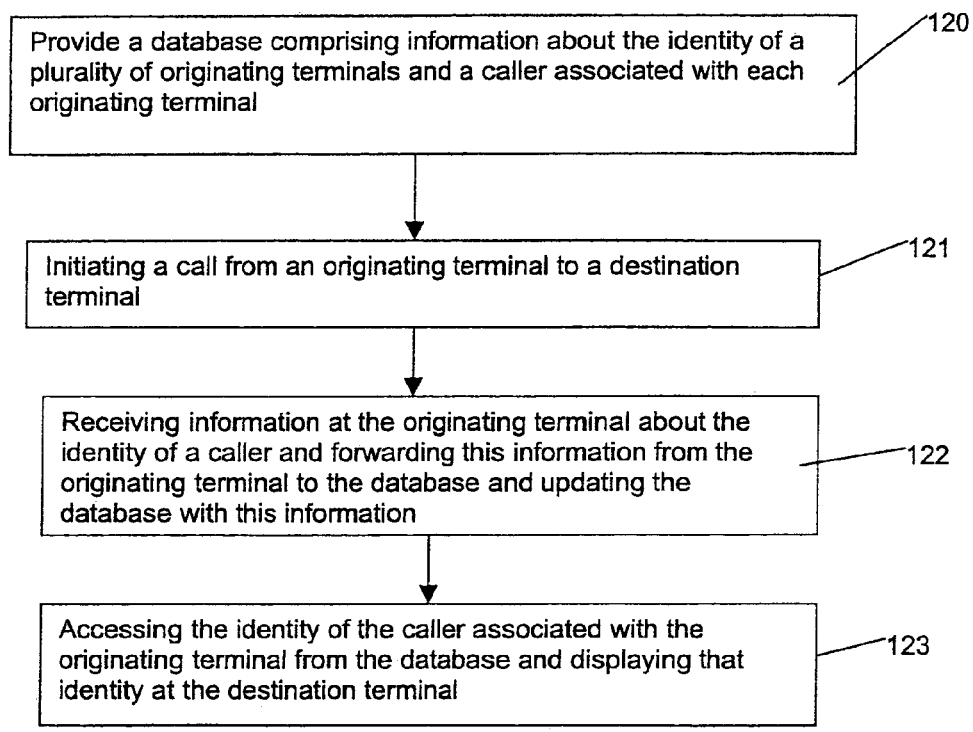
FIG. 11 is a flow diagram of a method of displaying information about the identity of a caller at a destination terminal.

FIG. 11 is a flow diagram of a method of displaying information about the identity of a caller at a destination terminal comprising the steps of:
  providing a database comprising information about the identity of a plurality of originating terminals and a caller associated with each originating terminal (box 120);
  initiating a call from an originating terminal to a destination terminal (box 121);
  receiving information at the originating terminal about the identity of a caller and forwarding this information from the originating terminal to the database and updating the database with this information (box 122); and
  accessing the identity of the caller associated with the originating terminal from the database and displaying that identity at the destination terminal (box 123).

A range of applications are within the scope of the invention. These include situations in which it is required to control a destination terminal from an originating terminal. For example, to cause information about the identity of a caller to be displayed at the destination terminal. Another example involves providing information about the priority of a call and allowing the behaviour of the destination terminal to be adjusted in response to the call priority. As well as this, it is possible to clear an "in progress" call from an engaged destination terminal and to take into account configuration information on the destination terminal. Users are also able to adjust the configuration of terminating services on their terminals from a remote location.

APPENDIX A

A method of associating computer software code with signalling protocol messages such as Session Initiation Protocol (SIP) messages is now described by repeating some of the text from Nortel Network's earlier co-assigned U.S. patent application Ser. No. 09/520,853. However, it is not essential to use the improved SIP protocol described below. Any suitable protocol and method for associating computer software code with signalling protocol messages may be used.

The term "SIP Client" is used to refer to a computer program that is arranged to control a communications network node such that it is able to send SIP messages such as SIP request messages. The computing platform that the SIP client runs on is referred to as a "host system". The communications network node either comprises the host system or is associated with the host system.

The term "Java virtual machine" is used to refer to a processor which is arranged to execute Java applets or Java byte code.

The term "mobile autonomous software agent" is used to refer to a computer program that is able to halt itself and move itself from a first processor to another processor that is connected to the first processor for example by a communications network. The computer program is referred to as being autonomous because it is able to "decide" where to move and what it will do independently of external requests. An example of a mobile autonomous software agent is a Java mobile agent. Details about Java mobile agents are given in the article, "Under the Hood: The architecture of aglets", by Bill Venners, JavaWorld April 1997 the contents of which are incorporated herein by reference.

By extending the SIP protocol increased functionality is provided. SIP messages are modified to carry computer software code such as Java applets or to carry an address such as an universal resource locator (URL) indicating where computer software code is stored. An application programming interface (API) is also defined which allows the computer software code to interact with a receiving host system. SIP clients are also modified in order that they execute the computer software code associated with the SIP messages before any other actions are taken as a result of receipt of the SIP message.

Figure 12:
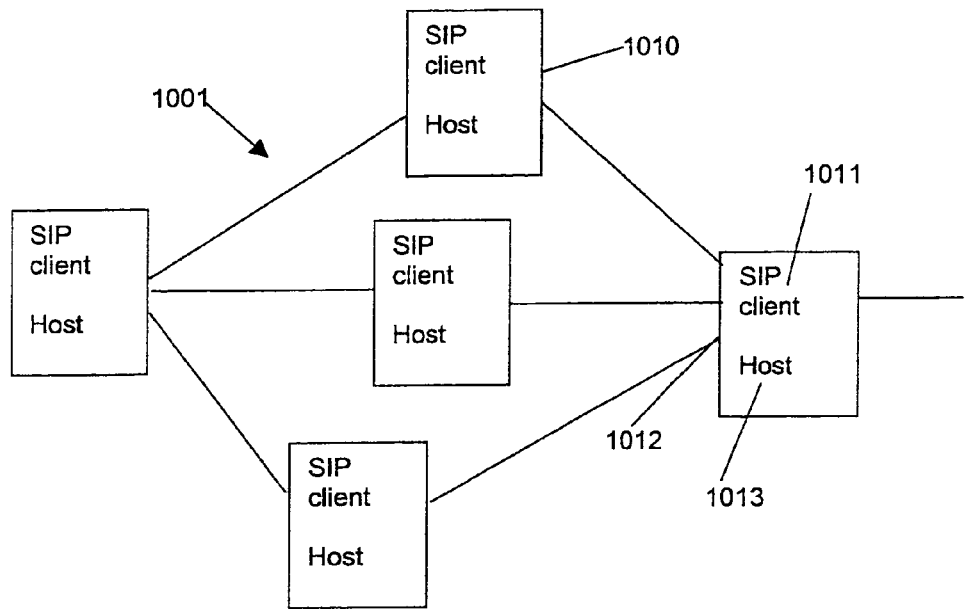
FIG. 12 is a schematic diagram of a communications network which incorporates nodes for implementing an improved SIP protocol.

FIG. 12 shows a communications network 1001 comprising a plurality of communications network nodes 1010 each such node comprising:
  a SIP client 1011;
  an input 1012 arranged to receive SIP messages which may be associated with computer software code; and
  a processor 1013 arranged such that in use, when a SIP message is received, any computer software code associated with that SIP message is executed by the processor. This processor is provided by the host system and may comprise a Java virtual machine or any other suitable processor. These communications network nodes are referred to as enhanced SIP nodes because they are arranged to allow the enhanced SIP process to work.

Figure 13:
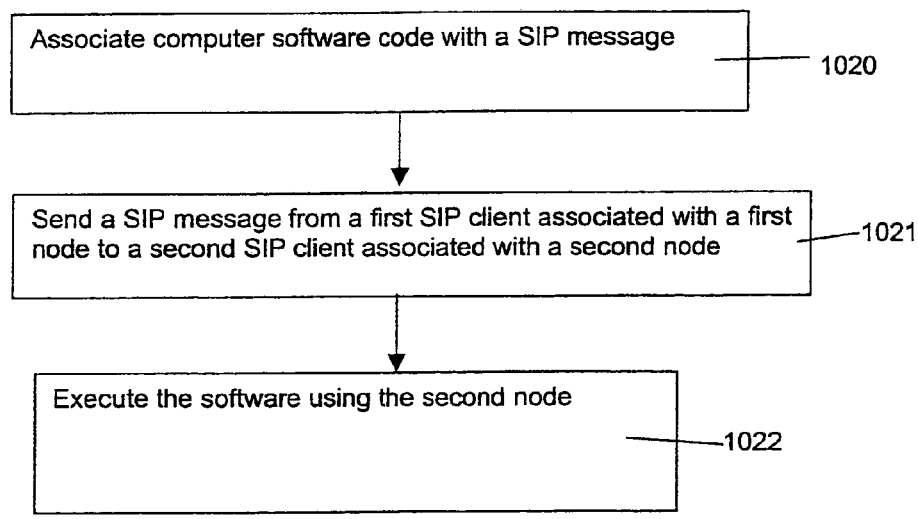
FIG. 13 is a flow diagram of a method of communicating between two SIP clients using an improved SIP protocol.

The communications network of FIG. 12 is used in conjunction with the method illustrated in FIG. 13 in order to implement the enhanced SIP process. FIG. 13 is a flow diagram of a method of communicating between a first and a second node in a communications network, each of said nodes comprising a SIP client, said method comprising the steps of:
  associating computer software code with a SIP message (box 1020 in FIG. 13);
  sending the SIP message from the first SIP client associated with the first node to the second SIP client associated with the second node (box 1021 in FIG. 13); and
  executing the computer software using the second node (box 1022 in FIG. 13).

Figure 14:
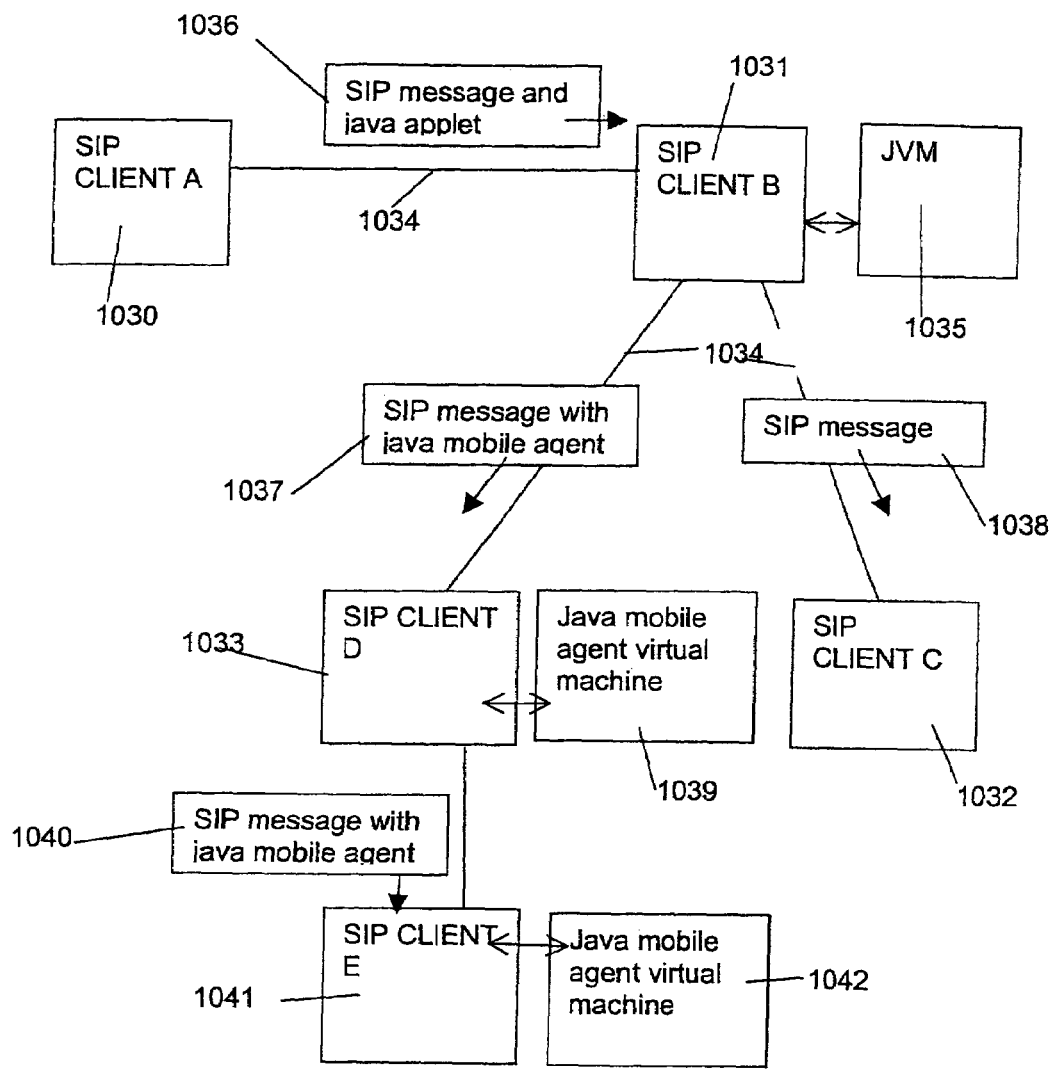
FIG. 14 is a schematic diagram of interaction between a plurality of SIP clients according to the improved SIP protocol.

For example, FIG. 14 illustrates an example of how a plurality of enhanced SIP clients 1030, 1031, 1032, 1033, 1041 interact. Each SIP client is supported on a communications network node (not shown). SIP client A 1030 is connected to SIP client B 1031 via a communications link 1034 and SIP client B 1031 is connected to both SIP client C 1032 and SIP client D 1033 via communications links 1034. SIP client B 1031 has a host system 1035 which comprises a Java virtual machine. SIP client D 1033 is also connected to SIP client E via a communications link. SIP client D and has a host system 1039 which comprises a Java mobile agent virtual machine and SIP client E 1041 also has a host system 1041 which comprises a Java mobile agent virtual machine 1042.

Using the enhanced SIP protocol, computer software code such as Java applets are associated with a SIP message 1036. That is, the computer software code may be added to the SIP message body itself or may be stored separately and an address of the storage location added to the SIP message. It is not essential to use Java applets or Java mobile agents; any other suitable computer software code may be used. The message 1036 is sent from SIP client A 1030 to SIP client B 1031. SIP client B detects the presence of the Java applets (or other computer software code) associated with the SIP message 1036 and executes these Java applets using its Java virtual machine 1035 (or other type of host processor).

Any suitable method of detecting the presence of computer software code associated with the SIP message 1036 may be used. For example, an indicator may be placed in the header of the SIP message 1036 and the SIP client 1031 arranged to detect that indicator and associate it with the presence of computer software code. An example of such an indicator in a SIP message is described in more detail below.

By executing the Java applets, two new SIP messages 1037, 1038 are created one of which 1037 contains a Java mobile agent and the other which does not. This is just one example of a something that the computer software code associated with the SIP message could do. For example, the computer software code could also be arranged to modify existing SIP messages, delete existing SIP messages, generate SIP messages, receive SIP messages or to control the SIP client and/or the host processor to perform any other suitable function. The computer software code is arranged to interact with the host processor via an API as described below. Security restrictions may be enforced by the SIP client and or host system in order to limit the actions that any software code associated with a SIP message is able to effect. More detail about these security restrictions is given below.

The executed Java applets then cause SIP client B 1031 to send one of the created messages 1037 to SIP client D 1033 and the other 1038 to SIP client C 1032. The message 1037 sent to SIP client D contains a Java mobile agent (or other computer software code or an address of computer software code). If SIP client D has the capability to execute the Java mobile agent contained in message 1037 then SIP client D does so. However, if SIP client D does not have this capability, for example, if SIP client D has no Java mobile agent virtual machine, then SIP client D simply follows the standard SIP procedure for unsupported require extensions. This involves returning an error message to SIP client B, indicating that the Java applet in message 1037 was not executed.

In the meantime, SIP message 1038 which is not associated with any computer software code, is sent to SIP client C 1032 and any SIP process associated with that message 1038 is carried out following the standard SIP protocol.

In this example, SIP client D does have an associated Java mobile agent virtual machine 1039 and so when message 1037 arrives, the Java mobile agent in message 1037 begins to execute on this processor. At some point in the execution, the Java mobile agent suspends itself and includes itself in SIP message 1040 which is sent to SIP client E. This is one example of a process that may occur by incorporating a Java mobile agent into a SIP message.

In the enhanced SIP protocol described herein, standard SIP messages are modified by associating computer software code with them as described above. For example, one or more Java applets or Java mobile agents are stored in a multipart MIME section in the body of a SIP message or a URL indicating where the Java applets or Java mobile agents are stored is added to the SIP message.

In some examples, an indicator is added to the SIP message header, in order to indicate that computer software code is associated with that SIP message. For example, a "Require request-header" is used to indicate that Java enhanced SIP must be supported to process a SIP message that is associated with Java applets or Java byte code. This require request header is the same as the header for a standard SIP message except that the content type field in the entity header is used to indicate that the content type is a Java applet or the URL of a Java applet which must be retrieved. Also, the require field of the request-header is used to specify that Java enhanced SIP must be supported to process the message concerned.

FIG. 15 illustrates the structure of a standard SIP message and shows how this structure is used in the improved SIP protocol described herein. The structure of a standard SIP message is illustrated at 1040 in FIG. 15. Thus a standard SIP message comprises a general-header, a request-header, an entity header, a CRLF and a message body. The structure of a general-header is shown at 1041 in FIG. 15 and similarly the structures of each of an entity header 1042, request header 1043 and response header 1044 are shown. In order to indicate that the improved SIP protocol described herein is being used markers or tags are included in the SIP message in any suitable location. For example, the content-type field of an entity header may be used to indicate that the content type is a Java applet or the URL of a location of a Java applet. Similarly, the content-type field of an entity header may be used to indicate that the content type is a Java mobile agent or the URL of a location of a Java mobile agent. Also, the require field of a request header may be used to indicate that Java enhanced SIP must be supported to process the message concerned. However, it is not essential to use the content-type field or the require field for this purpose. Any other suitable field(s) may be used.

FIG. 16 shows an example of an INVITE message according to the improved SIP protocol described herein. The content type field contains the words "multipart/mixed" which indicates that the INVITE message body is in the form of a MIME multipart message which contains one or more Java applets or Java mobile agents. The require field contains the words "org.ieff.sip.java-enhanced-sip" which indicate that the improved SIP protocol must be used to process this message. Part of the body of the INVITE message containing the Java applet(s) or Java mobile agents is shown 1050.

The SIP clients used to implement the improved SIP protocol are the same as standard SIP clients except that they are arranged to do the following things:

Detect improved SIP messages which are associated with computer software code. For example, this may be done by arranging the SIP client to recognise the presence of the words "org.ietf.sip.java-enhanced-sip" or "org.ieff.sip.java-mobile-agent-enhanced-sip" in the SIP message header.

If an improved SIP message is received and detected, the software code associated with that SIP message is accessed by the SIP client and executed on the SIP client's host processor. Preferably, this execution is carried out immediately, before processing the SIP message any further. For example, if a content type field in a SIP header indicates that a URL for a Java applet is present then the SIP client must immediately get the applet from the URL and execute the applet on a Java virtual machine associated with the SIP client. If the SIP client does not execute the software code then it is preferably arranged to respond by returning status code 420 (bad extension) and by listing org.ieff.sip-.java-enhanced-sip in an unsupported header. The SIP client may not execute the software code if it is unable to do so, for example, if no Java virtual machine is available, or if the SIP client decides not to do this, for example, for security reasons.

Match incoming SIP messages to patterns and in the event of a match "wake up" any waiting computer software code. This is described in more detail below.

The SIP client's host processor is modified as compared to a standard SIP client's host processor in that it must comprise a processor of a specific type. For example, a Java virtual machine in the case that Java applets are associated with the improved SIP messages. In the case that Java mobile agents are used, a Java mobile agent virtual machine is required. Also, the SIP client's host processor has access to or comprises an API to allow the computer software code associated with the improved SIP messages to interact with the SIP client. For example, in the case that Java applets are used, the SIP client's host has access to a set of Java classes or applets that are defined in a Java enhanced SIP API. This API allows access into the SIP client to allow SIP messages to be built and sent subject to security restrictions. Using the API received Java applets or Java mobile agents are able to generate and receive SIP messages using the receiving SIP client.

Passing of control between the computer software code associated with improved SIP messages and the SIP client concerned.

In the case that standard SIP messages are used, these are processed by SIP clients in the standard way and control remains with the SIP clients. However, in the improved SIP case described herein, any computer software code associated with a SIP message takes precedence over other standard SIP processes associated with the SIP message or with any other SIP messages received by a SIP client during processing of the computer software code.

For example, the computer software code associated with a SIP message can be arranged to initiate a SIP session and to wait for a SIP response before proceeding. During this waiting period, control remains with the computer software code. The computer software code is able to specify that it will go to sleep and wait for the next SIP message which matches a particular patter. In that case, the SIP client does no other actions during the sleep period. Alternatively, the computer software code can deal with any other incoming SIP messages itself during the sleep period. Thus control does not pass back to the SIP client until the computer software code wants it to even if SIP messages from other sessions are arriving.

Application Programming Interface (API)

As described above an API is specified in order that the computer software code associated with improved SIP messages is able to affect the SIP client. For example, this API allows a received Java applet or Java mobile agent access to the SIP messaging functions on the SIP client.

Examples of methods that the API supports comprise:

SendSIPMessage—sends a SIP message and establishes a context for the Session if one does not already exist. The invoker (which is the piece of software code which called this function) can indicate if it wants the message to be part of an existing Session. For example, the invoker could be a Java applet or Java mobile agent.

ReceiveSIPMessage—retrieves a SIP message from the Client's input buffer on a first in first out (FIFO) basis.

ReceivedMessageSummary—returns a summary of any received messages in the client's input buffer along with a count of messages received. If the client does not support buffering of input messages this is indicated.

QueryCapabilities—returns the capabilities of the Client. These include the ability to buffer incoming messages and the buffer size.

Querystatus—returns the status of any sessions the client is currently involved in.

MatchMessageAndWake—checks incoming messages against a particular pattern and if they match wakes up the indicated applet or Java mobile agent and passes the messages directly to the indicated applet.

ProcessMessage—sends a message to the Client and passes control to the client for the message to be processed as in standard SIP. For example, this can be used after an applet or Java mobile agent has looked at the message or altered it in some way and then wants to pass the message back to the client to be processed as in standard SIP.

ProcessMessageAndReturn—as for ProcessMessage except that control is passed back to the invoker after the message has been processed.

ProcessFromBufferAndReturn—processes the next message on the INPUT buffer as in standard SIP within the client and then returns control to the invoking applet or Java mobile agent.

Changes to SIP Proxy and SIP Server Behaviour

Following standard SIP as defined in "Request for comments (RFC) 2543 SIP: Session Initiation Protocol", SIP proxy and redirect servers must ignore features that are not understood. That is, if a SIP proxy or redirect server is not arranged to understand the improved SIP messages described herein then it must ignore features of those messages that are not common to standard SIP. A SIP proxy server is a communications network node which communicates using the SIP protocol on behalf of other parties. A SIP redirect server is a communications network node which receives SIP messages and directs these to another communications network node. If a particular extension to the standard SIP protocol requires that intermediate devices support it, the fact that the extension is being used must be tagged in the proxy-require field as well (see section 6.28 of the SIP RFC mentioned above). Thus for the improved SIP described herein, an indicator is placed in the proxy-require field to specify that the improved SIP is being used.

Security

Preferably, security mechanisms are incorporated in to the improved SIP protocol although this is not essential. For example, a host system which supports a SIP client preferably comprises security mechanisms for controlling the activity of software code such as Java applets or Java mobile agents received as a result of the improved SIP messages. These security mechanisms may be configured by a user or operator, for example, to always allow or prevent certain operations from being carried out by Java applets or Java mobile agents received from improved SIP messages. The user may datafill a matrix of SIP operations against security mechanism actions. It is also possible for the security mechanism to prompt the user to ask for permission to proceed with certain actions. The security mechanisms are put into effect by a security manager which takes the form of a computer software application located at each SIP client. Preferably, all the methods specified in the API are arranged to check with the security manager at the SIP client concerned before proceeding with the rest of that method. In the case that Java byte code, Java applets or Java mobile agents are used, then the security mechanisms are preferably designed to conform to the standard Java security practices.

An example of an algorithm for a security mechanism is:
  Index the matrix for user defined security checks against that operation
  Extract the method corresponding to the security action datafilled by the user
  Execute that security mechanism method
  If the result of the security mechanism method is "pass" then continue and call the SIP API method
  Else display a security disallowed message and return without calling the SIP API method.

Actions that a user may datafill for a given SIP operation include:
  Allow always
  Disallow always
  Allow conditional
  Disallow conditional
  Prompt y/n
  Allow and display warning or info An example of use of the improved SIP protocol to create a service for automatically setting up multimedia conferences is now described.

Conferencing System

Using the improved SIP protocol a conferencing service is created whereby a single chairperson is able to set up the conference by sending out SIP INVITE messages. The method is suitable for multimedia conferences. The INVITE messages are associated with computer software code which executes on the host machines of invited attendees to set up the conference call. This greatly simplifies the process of setting up a conference call such as a multimedia conference call.

For example, the computer software code associated with the improved SIP INVITE messages can be arranged to set up connections from each attendee's machine to several video sources and to an electronic whiteboard to be shared for the meeting. The computer software code can also be arranged to start up a web browser to a page relevant to the meeting on each attendee's machine. As well as this the computer software code is able to set up all the audio paths between all the parties with everyone but the chairman initially on mute. As well as this the computer software code is able to take into account different capabilities of individual attendee's host machines. For example, a particular attendee such as a mobile caller may only have audio capabilities whilst a full multimedia caller may have audio, video, data and web capabilities. In order that these capabilities are taken into account, attendee's indicate what their capabilities are in SIP messages as required.

The multimedia conferencing service is particularly advantageous from the attendee's point of view. All the attendee has to do is to accept the incoming call and SIP INVITE message and everything will be set up for them automatically. Alternatively, the attendee may call a conference number and receive a SIP message in reply which is associated with the required computer software code. The conference number may be the number of a particular user client or of a central conference service provider.

Preferably security mechanisms are used in the multimedia conferencing service as described above.

Figure 17:
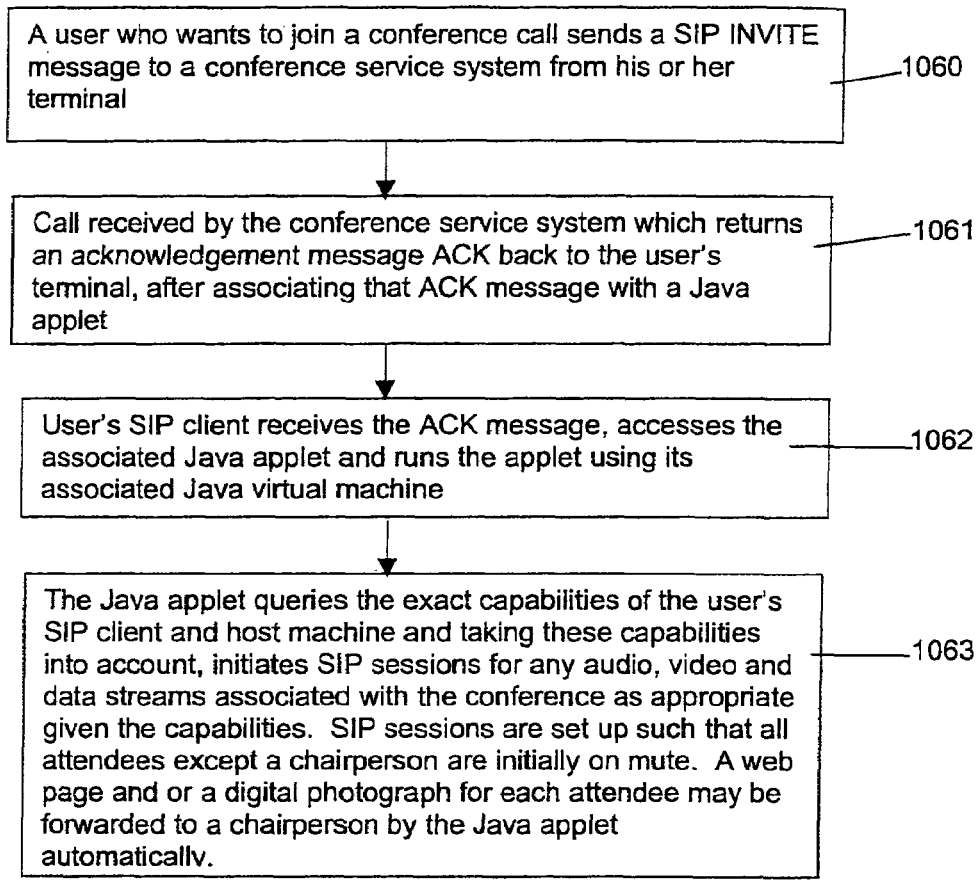
FIG. 17 is a flow diagram of a method of setting up a conference call using a conference call service system.

FIG. 17 is a flow diagram of a method where a central conference service system is used and where Java applets are associated with the improved SIP messages. The first stage involves a user who wants to join a conference call sending a SIP INVITE message to the conference service system from his or her terminal (box 1060 FIG. 17). This call is received by the conference service system which then returns an acknowledgement message ACK back to the user's terminal (box 1061 FIG. 17). This ACK message is associated with one or more Java applets which contain methods from the API discussed above. The user's SIP client receives the ACK message, accesses the associated Java applet(s) and runs these using its associated Java virtual machine (box 1062 FIG. 17).

The Java applet(s) query the exact capabilities of the user's SIP client and host machine and taking these capabilities into account, initiate SIP sessions for any audio, video and data streams associated with the conference as appropriate given the capabilities (box 1063 of FIG. 17). Depending on how the user has his or her security mechanisms set he or she may be prompted before the sessions are set up for the various media streams. When the Java applet(s) initiate the SIP sessions (box 1063 of FIG. 17) they may also be arranged to set up these SIP sessions such that all the attendees except for a chairperson are on mute. This is particularly advantageous, because the chairperson is then easily able to announce the beginning of the meeting and to chair the meeting in an organised fashion.

The Java applets(s) may also be arranged to forward details of a web page from each attendee to a chairperson or to the conference service system. For example, a web page giving biographical details of each attendee may be forwarded to a chairperson who then makes these available to each other attendee. In a similar manner, digital photographs of each attendee may be forwarded to the chairperson by the Java applets. It is also possible for the Java applets to request a joining message from each attendee which is then forwarded to a chairperson automatically by the Java applets. This joining message may contain security requirements specific to each attendee.

Depending on the number of parties to the conference, a conferencing bridge facility may be used as is known in the art. Alternatively, a software based technique is used to connect the parties to the conference.

An example of an algorithm that is encoded in the Java applet(s) of the method described immediately above is:
  Read the message that the Java applet was associated with to obtain the addresses for the various streams in the call
  Query the capabilities of the SIP client
  Query the capabilities of the host system
  Based on the above information for each media type and application available on the conference call:

If this application and media type is supported on the SIP client, initiate a SIP session between the SIP client and the relevant SIP client for that media stream.

Initiate a SIP message to the central conference service system detailing the number and types of streams set up.

Figure 18:
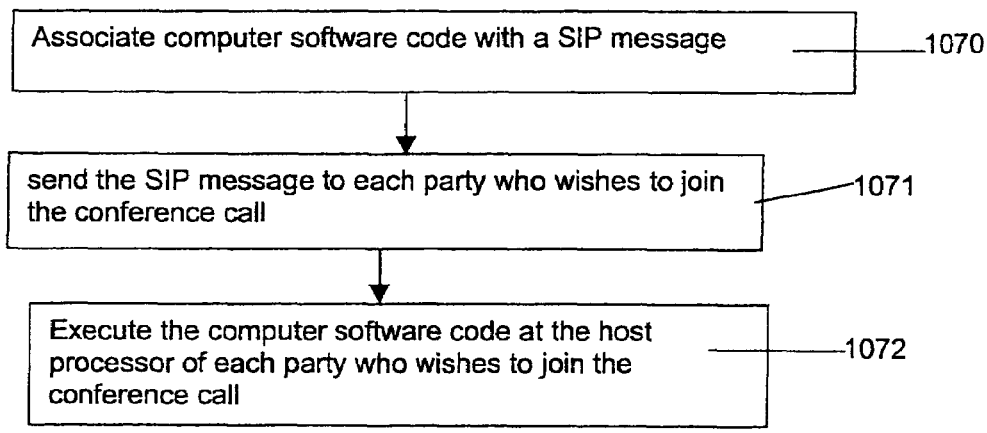
FIG. 18 is a flow diagram of a method of setting up a conference call.

FIG. 18 is a flow diagram of a method of setting up a conference call between two or more parties, each party comprising a SIP client and a host processor, said method comprising the steps of:

associating computer software code with a SIP message (box 1070 of FIG. 18);

sending the SIP message to each of the parties (box 1071 of FIG. 18);

executing the computer software code at each of the host processors (box 1072 of FIG. 18).

FIG. 12 also shows a system for automatically setting up a conference call between two or more parties 1010, each party comprising a SIP client 1011 and a host processor 1013, said system comprising:—a processor 1013 for associating computer software code with a SIP message and to send that SIP message to each of the parties 1010; and wherein each of said host processors 1013 is arranged to execute the computer software code in use, when the SIP message is received.

In the case that a conferencing system is used, this system sends the SIP messages to each party as a result of request calls from those parties to the system. In the case that a chairperson sets up the call, then the chairperson sends the SIP messages to each party.

Hunt Group System

An example of the use of improved SIP with Java mobile agents is now described. In this example, a service is provided whereby an automated system calls several telephones within a defined group (such as a team in an office) until one of those telephones is answered. For example, the nodes of the communications network in FIG. 12 may each provide a telephone implemented by software in the SIP clients 1011. Each telephone within the group 1001 comprises a SIP client 1011 and a host processor 1013 as illustrated in FIG. 12 and the telephones are connected to one another via a communications network 1001 as shown in FIG. 1012. The host processors each comprise a Java mobile agent virtual machine.

A user, which may be an automated service or a human using a terminal connected to the communications network 1001, telephones one of the telephones 1010 within the defined group. If the called telephone is not answered after a specified number of rings or an elapsed time, then software at the SIP client 1011 of the called telephone creates a Java mobile agent, associates this with a SIP message, and sends the SIP message to a predefined second SIP client. This second SIP client is one of the telephones within the defined group 1001.

The second SIP client receives the SIP message which is associated with the Java mobile agent. The Java mobile agent then executes itself on the Java mobile agent virtual machine associated with the second SIP client. The Java mobile agent is arranged to apply ringing to the second telephone and queries the second telephone's identification details and sends these back to the original caller. If the caller is using a host processor that has a display system associated with it, then information about the call and the fact that it has been forwarded to the second telephone in the defined group is sent by the Java mobile agent to this display.

If the second SIP client does not answer after a specified number of rings or time then the second SIP client repeats the method that the first SIP client carried out as described above. However, the second SIP client incorporates information about the fact that the call has been forwarded again.

After the method has been repeated a pre-determined number of times and if the call is not answered, then the call is sent back to the first SIP client that was called. A display of the route taken and the fact that the call was not answered is made at the first SIP client if a display is available.

If the call is answered, information about the route taken and the identity of the answering SIP client is sent back to the caller which may be an automated service.

Figure 21:
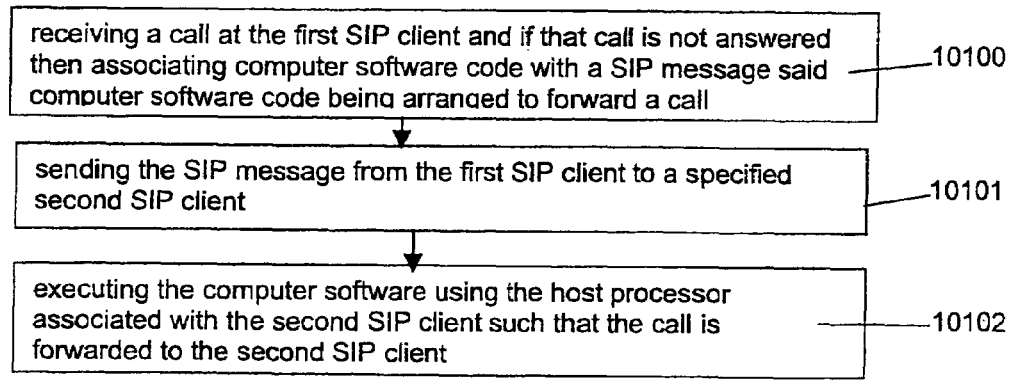
FIG. 21 shows a method of forwarding a call from a first SIP client to a second SIP client.

FIG. 21 shows a method of forwarding a call from a first SIP client to a second SIP client, each of said SIP clients being associated with a host processor, said method comprising the steps of:

receiving a call at the first SIP client and if that call is not answered then associating computer software code with a SIP message said computer software code being arranged to forward a call (box 10100 FIG. 21);

sending the SIP message from the first SIP client to a specified second SIP client (box 10101 FIG. 21); and executing the computer software using the host processor associated with the second SIP client such that the call is forwarded to the second SIP client (box 10102 FIG. 21).

Client test system

Another example of the use of Java mobile agents with improved SIP involves a test system for a pre-defined group of SIP clients. For example, the network of SIP clients shown in FIG. 12. The SIP clients 1011 are connected to one another to form a communications network 1001 as illustrated in FIG. 21. Each SIP client 1011 is associated with a host processor 1013 which comprises a Java mobile agent virtual machine.

Figure 20:
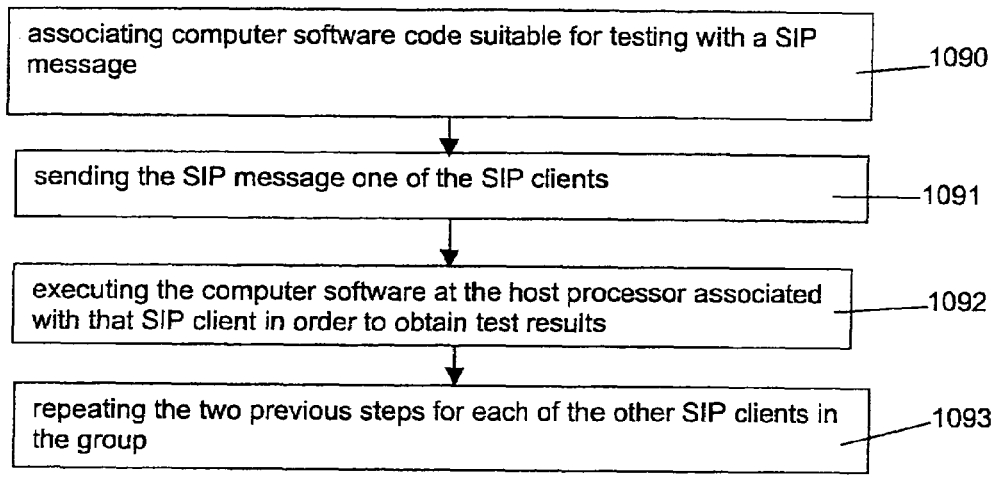
FIG. 20 shows a method of testing members of a group of SIP clients.

A test system (for example, software located at one of the nodes 1010 in the communications network 1001), which may be an automated software service, creates a Java mobile agent, associates this with a SIP message, and sends that SIP message to one of the SIP clients 1011 in the group. The Java mobile agent executes on the receiving SIP client and sets up one or more test sessions. The results of these test sessions are stored by the Java mobile agent in its private data, together with any other required information. The Java mobile agent then associates itself with another SIP message and arranges that this SIP message be sent to another SIP client in the group. When the SIP message reaches another SIP client the process of obtaining information is repeated so that more information is added to the Java mobile agent's private data. Another SIP message is used to send the Java mobile agent on to another SIP client and so on, until all the SIP clients in the group have been visited. Once all the SIP client's in the group have been visited by the Java mobile agent, this agent associates itself with a SIP message in order to be sent back to the originating SIP client. In this way the Java mobile agent is able to report the results of its tests to the originating SIP client. The Java mobile agent may also be arranged to initiate other actions to fix any faults that it finds as it finds them. FIG. 20 shows a method of testing members of a group of SIP clients each SIP client being associated with a host processor said method comprising the steps of:

associating computer software code suitable for said testing with a SIP message (box 1090 FIG. 20);

sending the SIP message one of the SIP clients (box 1091 FIG. 20);

executing the computer software at the host processor associated with that SIP client in order to obtain test results (box 1092 FIG. 20); and repeating steps (ii) to (iii) for each of the other SIP clients in the group (box 1093 FIG. 20).

Upgrade or replacement of SIP clients

Consider a situation in which it is required to upgrade or replace SIP clients which support the improved version of SIP described herein. This may be carried out automatically as follows:

The software for the upgrade or new SIP client is associated with a SIP message, for example, by building the software into a Java applet and adding this applet to a SIP message. This SIP message is then sent to all the SIP clients which are to be upgraded or replaced. On receipt of the SIP message at a SIP client, the existing SIP client runs the software code in order to effect the upgrade or replacement. The extent to which the upgrade or replacement is effected depends on the security specifications and the type of SIP client. By using the improved SIP protocol in this way, upgrades or replacement of a plurality of SIP clients is achieved quickly and easily.

Figure 19:
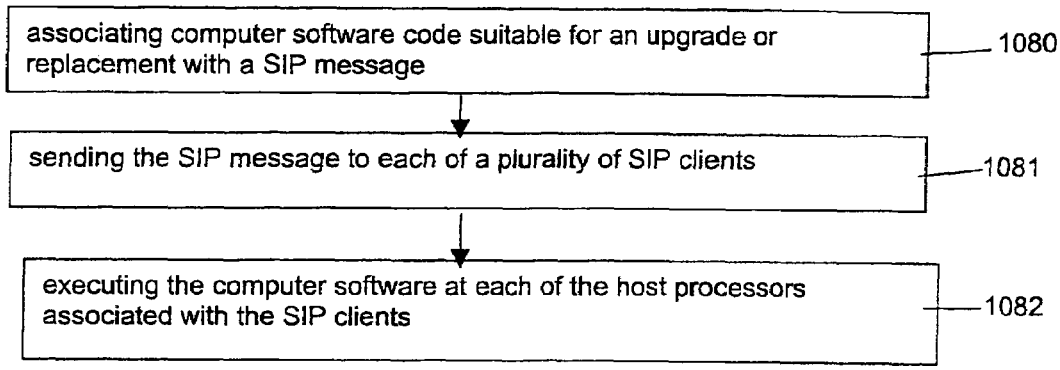
FIG. 19 shows a method of upgrading or replacing interconnected SIP clients.

FIG. 19 shows a method of upgrading or replacing interconnected SIP clients each SIP client being associated with a host processor said method comprising the steps of:— associating computer software code suitable for said upgrade or replacement with a SIP message (box 1080 FIG. 19);

sending the SIP message to each of the SIP clients (box 1081 FIG. 19); and executing the computer software at each of the host processors (box 1082 FIG. 19).

What is claimed is:

1. A method of remotely controlling a destination terminal from an originating terminal said destination terminal having an associated signalling protocol client and an associated processor comprising the steps of:
   (i) storing computer software code in at least one signalling protocol message;
   (ii) sending the signalling protocol message to the destination terminal from the originating terminal;
   (iii) executing the computer software code using the processor associated with the destination terminal in order that the originating terminal controls the destination terminal.

2. A method as claimed in claim 1 wherein said step (iii) of executing further comprises activating a security means at the destination terminal and executing the computer software code depending on the activated security means.

3. A method as claimed in claim 1 wherein said computer software code is arranged to access information about the identity of a caller.

4. A method as claimed in claim 3 wherein said computer software code is further arranged to display the identity information at the destination terminal.

5. A method as claimed in claim 1 wherein said computer software code is arranged to access information about a priority level for a call associated with the signalling protocol message.

6. A method as claimed in claim 1 wherein said computer software code is arranged to detect whether the destination terminal is engaged, and if so to clear the destination terminal in order that it is able to accept an incoming call associated with the signalling protocol message.

7. A method as claimed in claim 1 wherein said computer software code is arranged to access information from the destination terminal about the configuration of that terminal.

8. A method as claimed in claim 7 wherein said computer software code is further arranged to control the destination terminal on the basis of accessed configuration information.

9. A method as claimed in claim 1 wherein said computer software code is arranged to modify the configuration of terminating services associated with the destination terminal.

10. A method as claimed in claim 1 wherein said computer software code is arranged to direct a call associated with the signalling protocol message to a voice mail system associated with a called party.

11. A method as claimed in claim 1 wherein said signalling protocol message is a session initiation protocol (SIP) message and wherein said computer software code is selected from: Java byte code, Java applets and mobile automated software agents.

12. A destination terminal comprising:—
    (i) a signalling protocol client arranged to receive one or more signalling protocol messages sent from an originating terminal;
    (ii) a processor arranged to access any computer software code stored in received signalling protocol messages in use; and wherein said processor is arranged to execute such accessed computer software code such that the destination terminal is controlled.

13. A destination terminal as claimed in claim 12 which further comprises stored security information and wherein said processor is arranged to check said security information before executing the accessed computer software code.

* * * * *